(12) United States Patent
Stafford

(10) Patent No.: US 11,509,884 B2
(45) Date of Patent: Nov. 22, 2022

(54) ASYMMETRIC ARRANGEMENT OF LEFT AND RIGHT DISPLAYS TO IMPROVE IMAGE QUALITY FOR A STEREOSCOPIC HEAD-MOUNTED DISPLAY (HMD)

(71) Applicant: Sony Interactive Entertainment Inc., Tokyo (JP)

(72) Inventor: Jeffrey R. Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/537,774

(22) Filed: Nov. 30, 2021

(65) Prior Publication Data

US 2022/0086422 A1    Mar. 17, 2022

Related U.S. Application Data

(62) Division of application No. 16/438,843, filed on Jun. 12, 2019, now Pat. No. 11,190,755.

(51) Int. Cl.

| | |
|---|---|
| *G02B 27/01* | (2006.01) |
| *H04N 13/344* | (2018.01) |
| *G09G 3/20* | (2006.01) |
| *G06F 3/01* | (2006.01) |

(52) U.S. Cl.
CPC ....... *H04N 13/344* (2018.05); *G02B 27/0172* (2013.01); *G06F 3/011* (2013.01); *G09G 3/2003* (2013.01)

(58) Field of Classification Search
CPC ............. H04N 13/344; G02B 27/0172; G09G 2320/0209

See application file for complete search history.

(56) References Cited

U.S. PATENT DOCUMENTS

| | | | |
|---|---|---|---|
| 8,390,675 B1 | 3/2013 | Riederer | |
| 2007/0291054 A1* | 12/2007 | Shin | G09G 3/003 345/694 |
| 2012/0050277 A1 | 3/2012 | Murakoshi et al. | |
| 2013/0021328 A1* | 1/2013 | Yang | H04N 13/15 345/419 |
| 2013/0044108 A1 | 2/2013 | Tanaka et al. | |
| 2013/0194385 A1 | 8/2013 | Noguchi | |
| 2014/0320614 A1 | 10/2014 | Gaudreau | |
| 2016/0035265 A1 | 2/2016 | Park et al. | |
| 2016/0171917 A1 | 6/2016 | Yang et al. | |
| 2017/0078651 A1 | 3/2017 | Russell | |
| 2017/0295353 A1 | 10/2017 | Hwang et al. | |
| 2018/0012534 A1 | 1/2018 | Park et al. | |
| 2018/0167607 A1 | 6/2018 | Okamoto et al. | |
| 2019/0158813 A1 | 5/2019 | Rowell et al. | |
| 2019/0318706 A1 | 10/2019 | Peng et al. | |

* cited by examiner

*Primary Examiner* — Sanghyuk Park
(74) *Attorney, Agent, or Firm* — John L. Rogitz

(57) ABSTRACT

A stereoscopic VR HMD has left and right display portions in which one of the display portions is arranged with a transformation to improve the perceived virtual image resolution and therefore the perceived virtual image quality. The transformation can include offsetting sub-pixels of one of the display portions in the horizontal and if desired vertical dimensions relative to the other display portion. By applying very small (sub-millimeter) offsets along with appropriately adjusted image data, two slightly different virtual images form a stereoscopic image with a perceived increased of resolution in the binocular overlap zone established by the display portions.

12 Claims, 6 Drawing Sheets

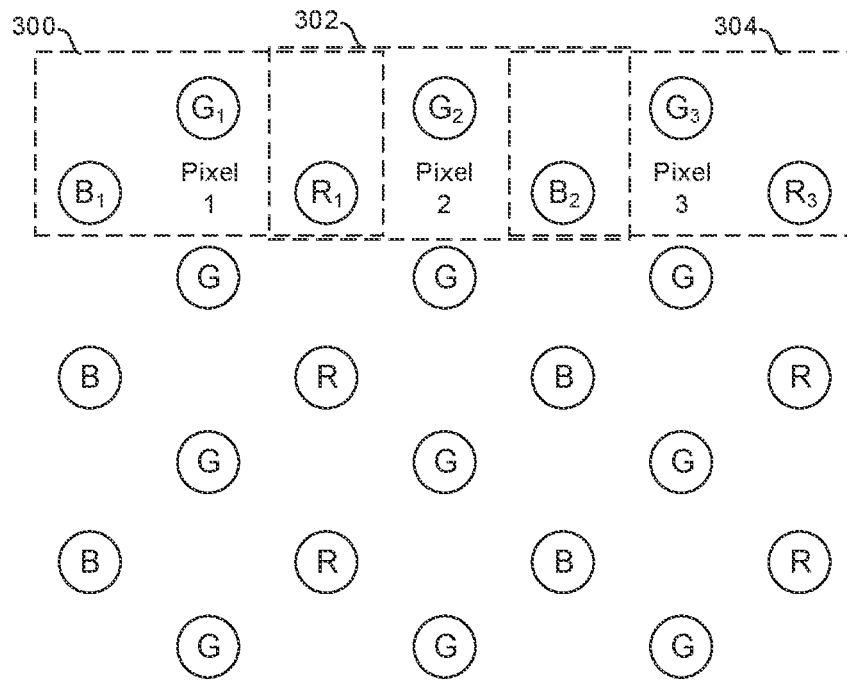
FIG. 3  Pentile
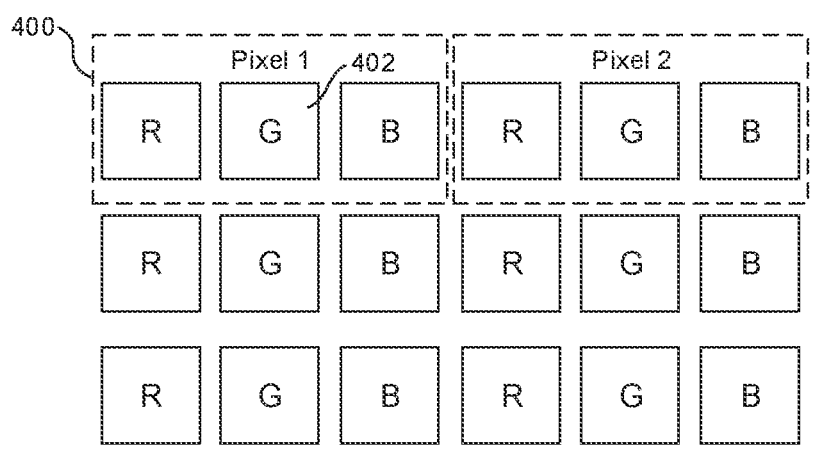
FIG. 4  RGB Stripe

ASYMMETRIC ARRANGEMENT OF LEFT AND RIGHT DISPLAYS TO IMPROVE IMAGE QUALITY FOR A STEREOSCOPIC HEAD-MOUNTED DISPLAY (HMD)

FIELD

The application relates generally to technically inventive, non-routine solutions that are necessarily rooted in computer technology and that produce concrete technical improvements. In particular, the present application relates to asymmetric arrangement of "PenTile®" (a trademarked term by Samsung Electronics to describe a specific sub-pixel element arrangement for displays) or other types of displays to improve image quality for a stereoscopic VR HMDs.

BACKGROUND

Some display technologies used for stereoscopic virtual reality (VR) head-mounted devices (HMDs) have varying pixel structure arrangements and pixel pitches mainly due to limitations of manufacturing complexities and/or cost. For example, a common pixel structure arrangement used in organic light emitting diode (OLED) displays is a matrix arrangement known as "PenTile" (a trademark of Samsung) that has a triangular or non-regular arrangement of sub-pixel elements. In such a matrix, red and blue sub-pixel elements are shared with other pixels. For example, a first pixel may have red, green, and blue sub-pixel elements, but a neighboring second pixel may have only a green sub-pixel element, sharing the red and blue sub-pixel elements with the first pixel. This sharing is repeated across the display horizontally and vertically so that only the green sub-pixel elements are enumerated at the display panel's full resolution, while the red and blue sub-pixels are enumerated to a quarter of the display panel's reported resolution. As an example, a 1920×1080 resolution display will have 1920×1080 Green sub-pixel elements, but 960×540 red sub-pixel elements and 960×540 blue sub-pixel elements.

As understood herein, a problem of using such matrix displays for VR is that the perceived virtual image resolution is less than that of a display that uses full resolution sub-pixel elements for red, green, and blue. Also, some displays have large pixel pitches, meaning relatively large gaps between the sub-pixel elements. The pixel pitch of a display also effects the perceived resolution and therefore the perceived virtual image quality. It is this perception of sub-optimum image resolution and therefore the sub-optimum quality of the VR image that present principles address.

SUMMARY

To address the problem noted above, for a stereoscopic virtual reality (VR), augmented reality (AR), or mixed reality (MR) HMD with separate display portions under an optical lens or lenses for each eye, the second display portion is arranged with a transformation to improve the perceived virtual image resolution and therefore the perceived virtual image quality. It is to be understood that while disclosure below refers to a VR HMD for explanation purposes, present principles apply equally to AR and MR. The transformations of the second display portion, for example the right eye display portion, can include offsetting sub-pixels in the horizontal and if desired vertical directions. When the same image is displayed on both (left and right) display portions, while under magnification by VR optical lenses, the stereoscopic image presented will typically show a two dimensional (2D) image placed at a set virtual plane (typically close to infinite focal distance, or usually termed focused at infinity) and the perceived resolution will match closely to the resolution of a single display portion as the pixels and sub-pixel elements align stereoscopically into the same virtual image point. This is the usual case for factory calibration VR systems such as PlayStation® VR. By applying very small (sub-millimeter) horizontal and vertical offsets to the right display portion image along with the appropriately adjusted image data, two slightly different virtual images form a stereoscopic image with a perceived increased of resolution.

While x- and/or y-axis offset is contemplated herein, so is rotation. Specifically, the sub-pixel element arrangement of one display portion can be rotated (e.g., by forty-five degrees) or otherwise moved to sufficiently relative to the other display portion, such that sub-pixel elements from one display portion are placed at different positions to another panel. This movement may be accomplished by using a different PenTile arrangement of sub-pixel elements made by possible by a different manufacturing process for the display portion. Or the display portion may be physically moved, but with display portion having a slightly different resolution and size. Also, the physically moved display portion can have portions cropped that are not under view by the optical lens. In addition to the different sub-pixel element positioning for the right display portion, appropriate image data is sent to the right display portion to account for the rotation of the sub-pixel elements. Also, the display driver pixel process may differ for the right display portion that has a different PenTile layout or the same layout with a physical movement.

Accordingly, in one aspect a method includes stereoscopically aligning left and right display portions configured to present identical left and right images in a head-mounted display (HMD). The method includes mechanically or optically shifting the left display portion relative to the right display portion or mechanically or optically shifting the right display portion relative to the left display portion to stereoscopically misalign the display portions with each other. In this way, a first sub-pixel element of the left display portion is misaligned by a distance approximating a width of a sub-pixel element with a corresponding first subpixel element of the right display portion.

In examples, the method includes mechanically or optically shifting the left display portion relative to the right display portion or mechanically or optically shifting the right display portion relative to the left display portion in a horizontal dimension defined by the display portions, and/or in a vertical dimension defined by the display portions, and/or in a depth dimension defined by the display portions, and/or in a rotational dimension defined by the display portions.

As contemplated herein, the first subpixel element of the right display portion and the first subpixel element of the left display portion simultaneously produce a first demanded image element to, in concert, render a stereoscopic image. Each pixel of each display portion may be established by three respective subpixels, and subsequent to misaligning the display portions, a binocular view of an optically overlapping region of the left and right display portions renders four or more subpixel elements per pixel. The method also may include reassigning pixels in a demanded image to account for the shifting.

In another aspect, a head-mounted display (HMD) includes a left display portion and a right display portion.

The display portions are configured for presenting identical images to produce a stereoscopic image in a binocular view of the display portions. "N" pixels in the left display portion can be activated to present "N" respective demanded image elements, with each pixel in the left display portion being established by three subpixel elements. Likewise, "N" pixels in the right display portion can be activated to present "N" respective demanded image elements, with each pixel in the right display portion being established by three subpixel elements. The "N" pixels in the right display portion are offset relative to the "N" pixels in the left display portion such that in the binocular view, each pixel includes four or more subpixel elements.

In example embodiments, the pixels in the right display portion are arranged in a layout in which a subset of subpixel elements are shared between pixels. An example of such a layout is a "PenTile" layout. In other embodiments, the pixels in the right display portion are arranged in a layout in which a subset of subpixel elements are not shared between pixels. An example of such a layout is a RGB stripe layout.

In example implementations, the "N" pixels in the right display portion are offset relative to the "N" pixels in the left display portion by a distance approximating a width of a subpixel element.

The "N" pixels in the right display portion can be offset relative to the "N" pixels in the left display portion in a horizontal dimension defined by the display portions, and/or in a vertical dimension defined by the display portions, and/or in a depth dimension defined by the display portions, and/or in a rotational dimension defined by the display portions.

In another aspect, an apparatus includes a left display portion and a right display portion juxtaposed with the left display portion to generate, in concert with the left display portion, a stereoscopic image having a binocular overlap region in which objects at infinity focus in the stereoscopic image have higher resolutions than objects at infinity focus in portions of the stereoscopic image outside the binocular overlap region.

The details of the present application, both as to its structure and operation, can best be understood in reference to the accompanying drawings, in which like reference numerals refer to like parts, and in which:

BRIEF DESCRIPTION OF THE DRAWINGS

FIG. 3 is a schematic diagram illustrating sub-pixel elements and pixels in a PenTile-type display portion;

FIG. 4 is a schematic diagram illustrating sub-pixel elements and pixels in an RGB-stripe display portion;

DETAILED DESCRIPTION

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer of virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser programs that can access websites hosted by the Internet servers discussed below. Also, an operating environment according to present principles may be used to execute one or more computer game programs.

Figure 1:
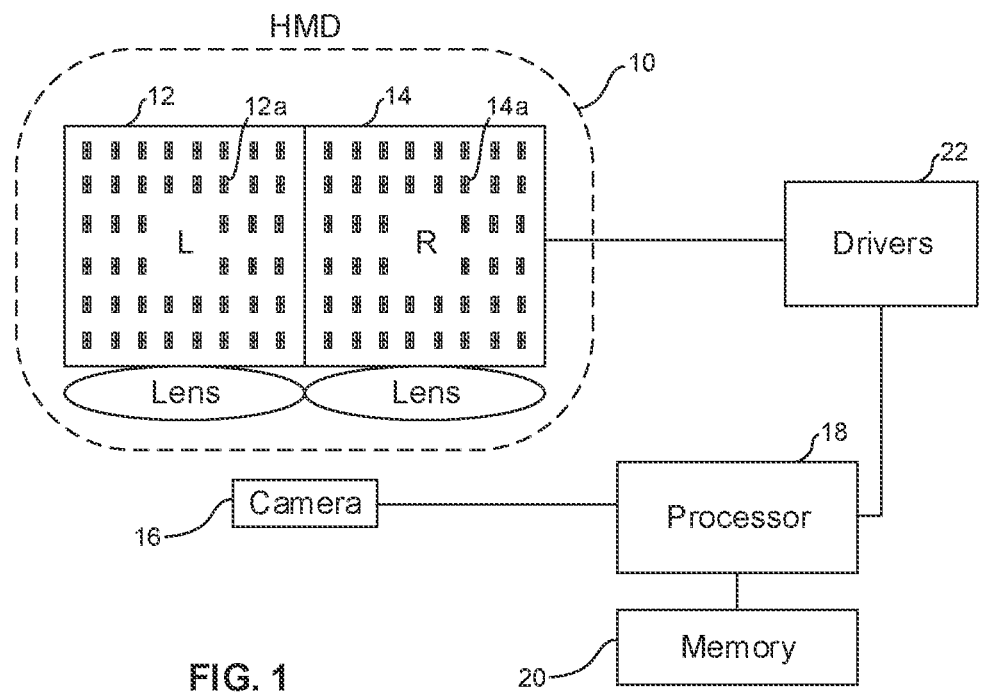
FIG. 1 is a schematic diagram of a system for aligning and shifting left and right display portions consistent with present principles.

Referring initially to FIG. 1, a head-mounted display (HMD) 10 such as but not limited to a Sony PlayStation® VR HMD includes a left display portion 12 and a right display portion 14. The display portions 12, 14 may be implemented by separate physical displays The display portions 12, 14 are configured for presenting identical images to produce a stereoscopic image in a binocular view of the display portions, described further below. Thus, "N" pixels 12A in the left display portion 12 can be activated to present "N" respective demanded image elements, with each pixel 12A in the left display portion 12 being established by three subpixel elements (shared or unshared between pixels depending on the type of display). Likewise, "N" pixels 14A in the right display portion 14 can be activated to present "N" respective demanded image elements, with each pixel 14A in the right display portion 14 being established by three subpixel elements. As will be discussed further below, the "N" pixels 14A in the right display portion 14 are offset relative to the "N" pixels 12A in the left display portion 12 such that in the binocular view, each pixel includes four or more subpixel elements.

FIG. 1 also shows one or more cameras 16 imaging the display portions 12, 14 and inputting image signals to one or more processors 18 accessing one or more computer memories 20 to produce demanded alignment images or other demanded images on the display portions 12, 14, via appropriate display drivers 22.

Figure 2:
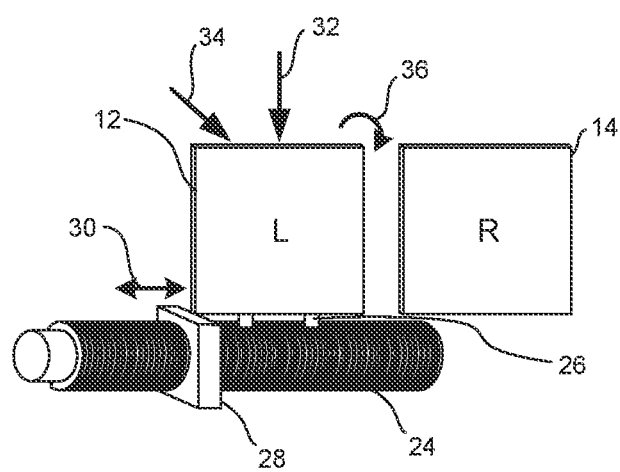
FIG. 2 is a schematic diagram of an example-non-limiting mechanism for moving one display portion relative to another consistent with the system of FIG. 1.

FIG. 2 illustrates an example non-limiting mechanism to mechanically shift one display portion (in the example shown, the left display portion 12) relative to the right display portion 14 by a distance approximating, e.g., the width of a subpixel element. For example, one display portion may be shifted relative to the other display portion by one-half to two times the width of a subpixel element.

In the example shown, a threaded shaft 24 is affixed by connectors 26 to a bottom edge of the left display element 1. A movable element 28 is engaged via the threads with the shaft 24 and can be turned to ride along the shaft 24 to urge against the left side of the left display portion 12 to move the left display portion in the horizontal dimension defined by the display portions relative to the right display portion 14, as indicated by the arrows 30. In addition, or alternatively, as indicated by the respective arrows 32, 34, 36, a similar mechanism may be engaged with the left display portion 12 to move the left display portion 12 relative to the right display portion 14 in the vertical, depth, and rotational dimensions, respectively. It is to be understood that the right display portion 14 equivalently may be moved relative to a stationary left display portion.

FIG. 3 illustrates a first subpixel layout in which subpixel elements are shared between pixels. In the example shown, FIG. 3 illustrates a PenTile layout, and green subpixel elements are denoted by the letter "G", red subpixel elements are denoted by the letter "R", and blue subpixel elements are denoted by the letter "B".

As shown, a first pixel 300 includes a first green subpixel element $G_1$, a first blue subpixel element $B_1$, and a first red subpixel element $R_1$. A second pixel 302 includes a second green subpixel element $G_2$, a second blue subpixel element $B_2$, and the first red subpixel element $R_1$ meaning that the first red subpixel element $R_1$ is shared between the first and second pixels 300, 302.

Similarly, a third pixel 304 includes a third green subpixel element $G_3$, the second blue subpixel element $B_2$, and a third red subpixel element $R_3$ meaning that the second blue subpixel element $B_2$ is shared between the second and third pixels 302, 304.

While each pixel in FIG. 3 is assigned its own, unshared green subpixel element, sharing red and blue subpixel elements with other pixels, it is to be understood that each pixel may be assigned its own unshared blue subpixel element, sharing green and red subpixel elements with other pixels, or that that each pixel may be assigned its own unshared red subpixel element, sharing green and blue subpixel elements with other pixels.

Thus, the pixels in the example display portion of FIG. 3 are arranged in a layout in which a subset of subpixel elements are shared between pixels. An example of such a layout is a "PenTile®" layout.

In other embodiments, the pixels in the display portions are arranged in a layout in which a subset of subpixel elements are not shared between pixels. An example of such a layout is a RGB stripe layout shown in FIG. 4, which shows that each pixel 400 is established by three unshared R, G, B pixel elements 402.

Figure 5:
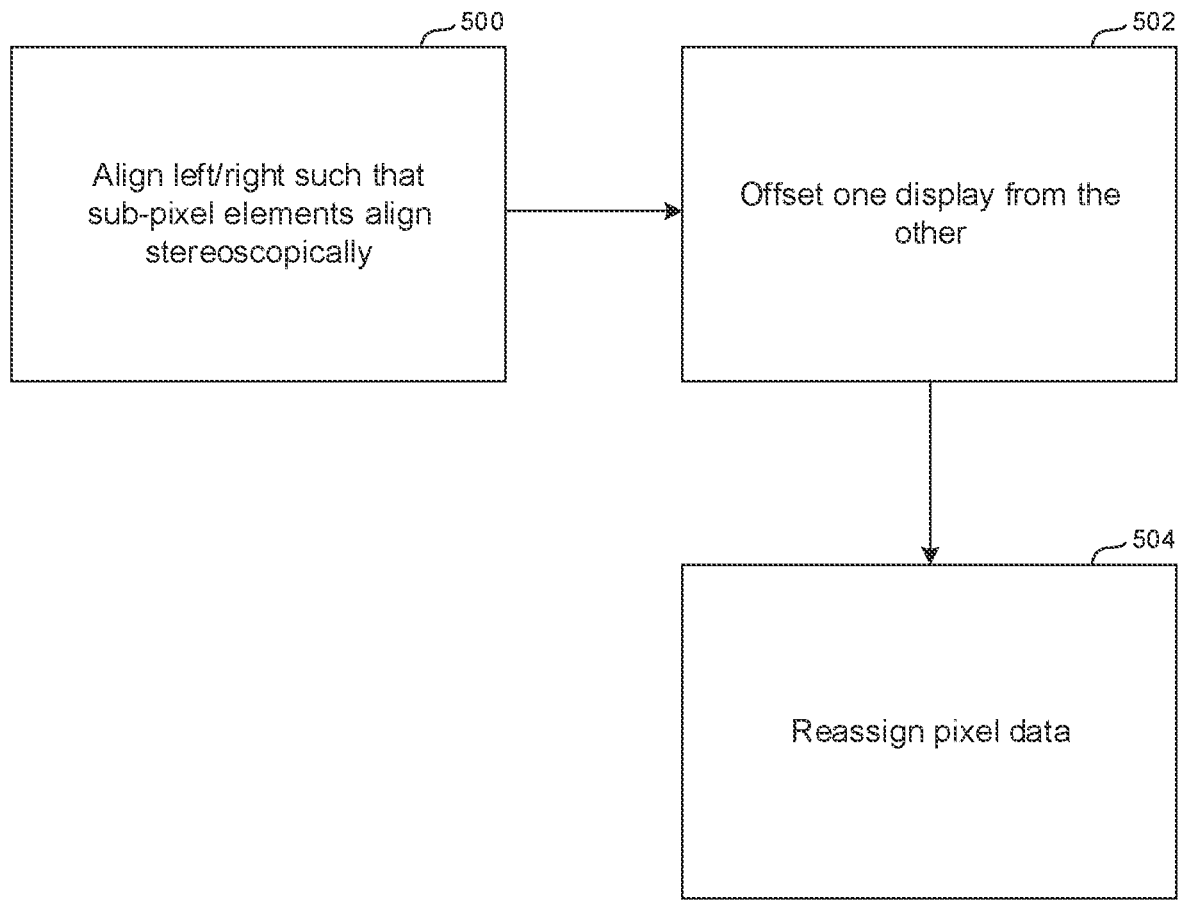
FIG. 5 is a flow chart of example logic consistent with present principles.

Now referring to FIG. 5, at block 500 the left and right display portions 12, 14, which are configured to present identical left and right images in, e.g., the head-mounted display (HID) 10, are stereoscopically aligned. In general, the processor 18 in FIG. 1 can activate individual pixel and/or subpixel elements which are imaged by the camera 16 which in turn feeds back signals to the processor. An indication of stereoscopic alignment error is output and used to appropriately move, in the example of FIG. 2, the movable element 28 to move one display portion relative to the other display portion until the alignment error is removed. In some embodiments alignment may be effected using the principles set forth in U.S. Pat. No. 7,538,876, incorporated herein by reference.

Once the display portions 12, 14 have been stereoscopically aligned, the process moves to block 502 to offset on display portion from the other. As indicated above, this may be done in various ways. When the example alignment mechanism shown in FIG. 2 is used, the step at block 502 may be done by mechanically shifting the left display portion 12 relative to the right display portion 14 (equivalently, mechanically shifting the right display portion 14 relative to the left display portion 12). This stereoscopically misaligns the display portions 12, 14 with each other. In this way, a first sub-pixel element such as the first red subpixel element $R_1$ of the left display portion 12 is misaligned by a distance approximating, in an example, a width of a sub-pixel element with a corresponding first subpixel element $R_1$ of the right display portion 14.

From block 502 the logic may flow to block 504 for reassigning pixels in a demanded image to account for the shifting. For example, as will become clearer from disclosure below, when a first pixel in the binocular overlap region is perceived to include two, not one, red subpixel and an adjacent second pixel is perceived to include two, not one, blue subpixels, and if the demanded image element originally assigned to the first pixel includes more blue than red and the demanded image element originally assigned to the second pixel includes more red than blue, the demanded image elements may be swapped between the first and second pixels.

Thus, in operation the first red subpixel element $R_1$ of the left display portion 12 simultaneously with the corresponding first red subpixel element $R_1$ of the right display portion 14 produces a first demanded image element to render a stereoscopic image.

Figure 6:
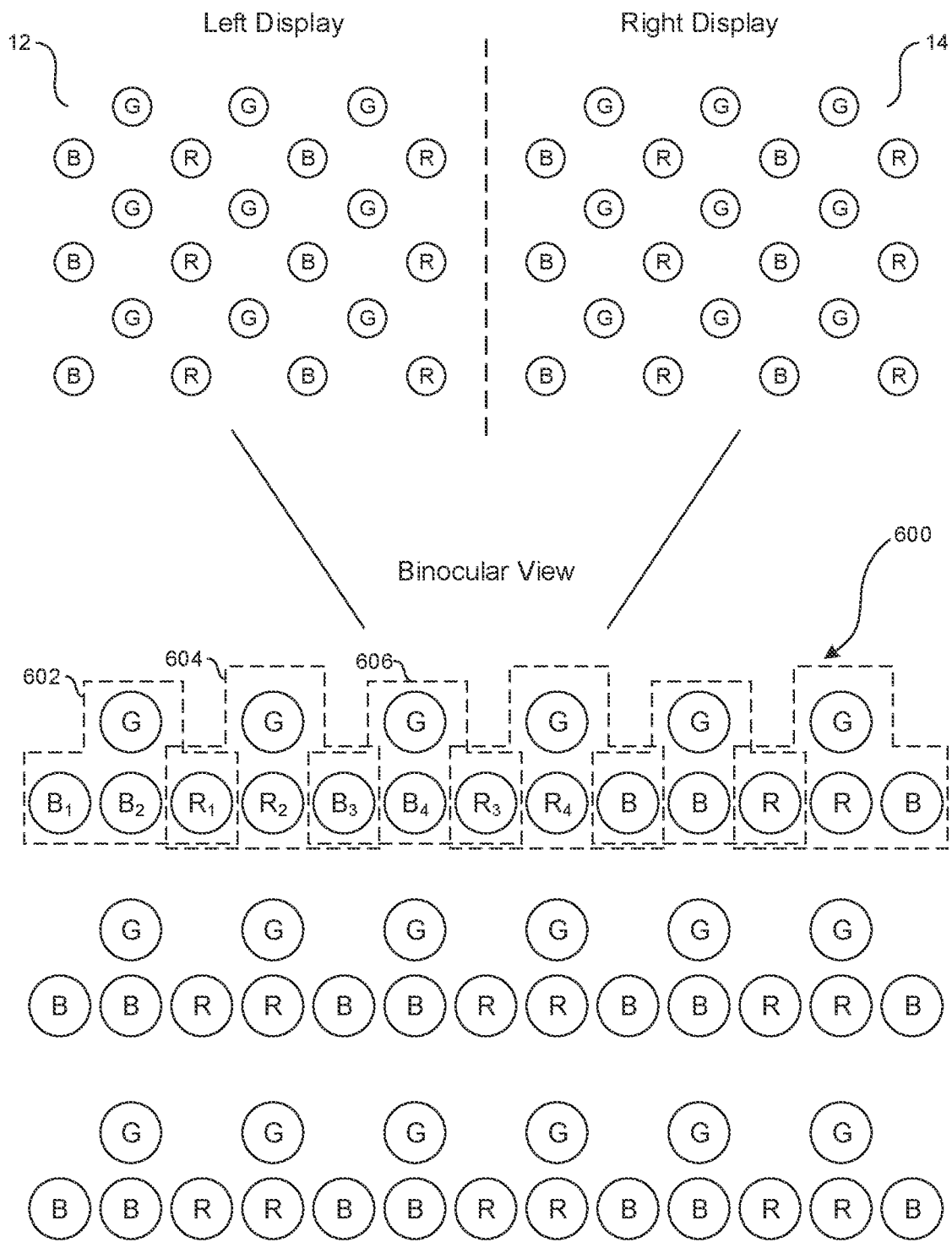
FIG. 6 is a schematic diagram illustrating sub-pixel elements and pixels in left and right PenTile-type display portions and how they are perceived in areas of binocular overlap by a person.

This leads to FIG. 6, showing that subsequent to misaligning the display portions 12, 14, a binocular view 600 is produced of the optically overlapping region of the left and right display portions in which four or more subpixel elements are rendered per pixel. It is to be understood that while the display portions shown in FIG. 6 that produce the binocular view have subpixel elements arranged in a PenTile layout, the subpixel elements may be arranged in other layouts, e.g., in RGB stripe. It is to be further understood that while the subpixel layouts of the two display portions are shown as having identical ordering of subpixel elements, one display portion may use a different order of subpixel elements than the other display portion. Thus, for example, one display portion may order subpixel elements, starting from the left in each row, B, R, in a repetitive pattern, the other display portion may order subpixel elements starting from the left in each row R, B in a repetitive pattern.

In the example shown, a first pixel 602 is established by four subpixel elements, namely, its own unshared green subpixel, first and second apparent blue subpixel elements $B_1$, $B_2$, and a first red subpixel element $R_1$. A second pixel 604 is established by its own unshared green subpixel, first and second apparent red subpixel elements $R_1$, $R_2$, and a third blue subpixel element $B_3$. Thus, the first red subpixel element $R_1$ is shared by the first and second pixels 602, 604. A third pixel 606 is established by its own unshared green subpixel, third and fourth apparent blue subpixel elements $B_3$, $B_4$, and a third red subpixel element $R_3$. Thus, the third blue subpixel element $B_3$ is shared by the second and third pixels 604, 606. It is to be understood that the pattern noted above for the first through third pixels 602-606 repeats throughout the binocular view or overlap region 600. When one display portion use a "BR" ordering and the other display portion uses an opposite "RB" ordering as mentioned above, the binocular view (with one display shifted) would result in B R B R B . . . instead of BB RR BB RR as shown in FIG. 6.

In this way, the display portions 12, 14 generate, in concert, a stereoscopic image with a binocular overlap region 600 in which objects (particularly for objects at infinity focus in the stereoscopic image) have higher resolutions than, e.g., objects in portions of the stereoscopic image outside the binocular overlap region.

It should be noted that spacing in the example of FIG. 6 between subpixel elements is not necessarily to scale. It is to be understood that in implementation, in the binocular view the spacing between adjacent green subpixel elements (G-to-G) is the same as the spacing of the BB, BR, RR, RB elements because in the left and right displays the spacing between the Green elements (GG) is the same as the spacing between the Blue and Red (BR, RB) elements.

Figure 7:
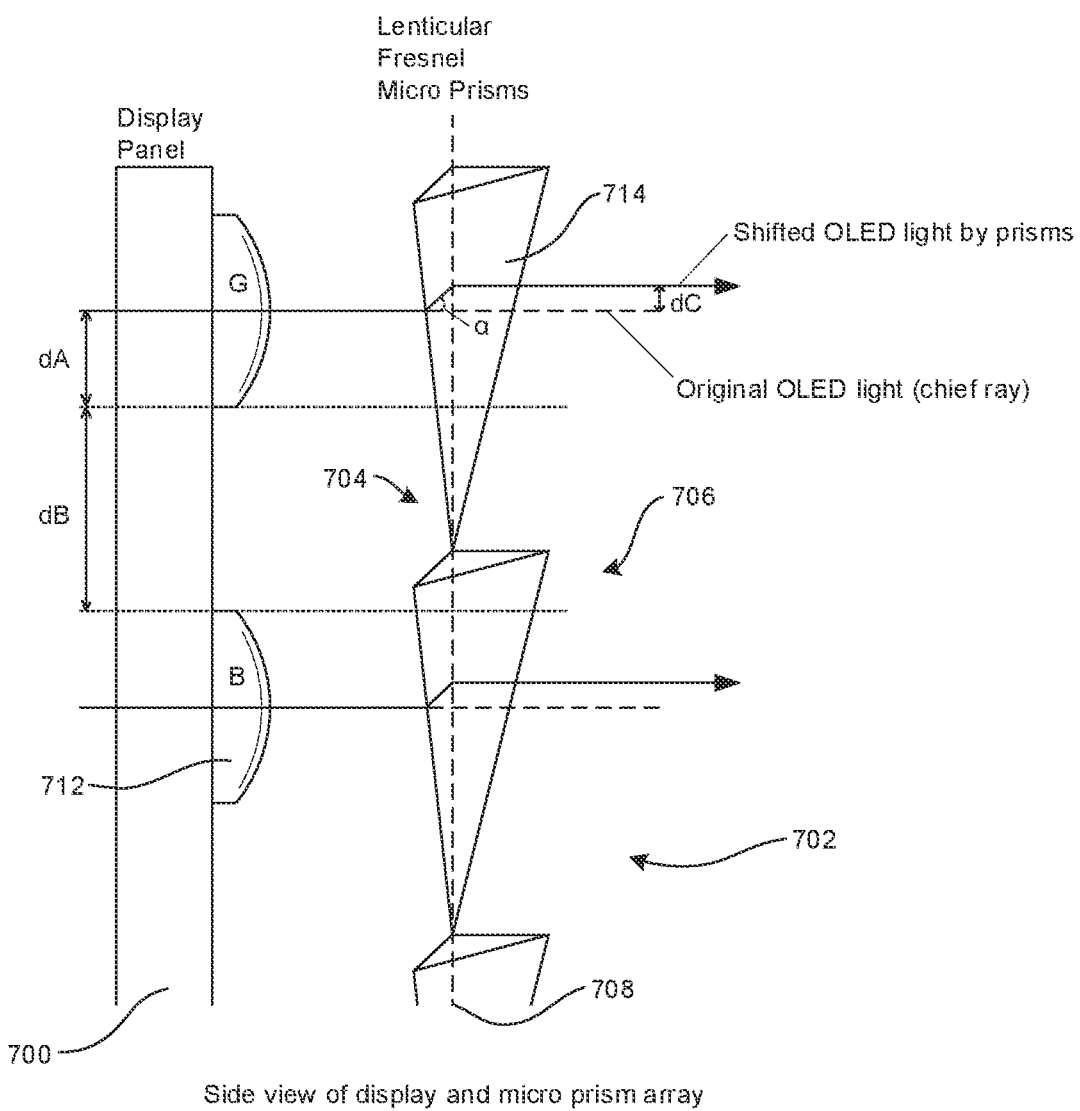
FIG. 7 is a schematic diagram of a micro prism array juxtaposed with one half of a monolithic display to optically shift subpixel elements in the half relative to the opposite half of the display.

FIG. 7 illustrates a side view of a portion of one-half 700 of a monolithic display, e.g., the left half, it being understood that the other half of the display is not shown but does not have its subpixels optically shifted in contrast to the half 700. The half 700 shown is the asymmetric arrangement of a left or right portion of a monolithic display, a micro lensing array film 702 can be applied to just the half 700 of the display.

The micro lensing array 702 may include one or more micro-Fresnel prism array layers (two layers 704, 706 shown closely juxtaposed and indeed abutting each other along a common flat plane 708). In an alternative embodiment, combinations of micro aspheric lenses and prisms are used.

Each layer 704, 706 comprises micro prism structures 710 that refract light to optically align to sub-pixel light emitters 712 (e.g., organic light emitting diodes (OLEDs)) as indicated in FIG. 7. Example micro Fresnel prisms may be obtained from the 3M Corporation (https://www.fresnelprism.com/prisms) or may be direction turning film structures from Luminit (https://www.luminitco.com/products/direction-turning-films).

The micro-Prism array film 702 optically shifts sub-pixel elements by the prism arrays via refraction as indicated by the lines 714, such that a HMD lens images a slightly shifted view of one portion of the display half 700. In other words, the light axis is optically shifted by a distance "AC" from the axis of emission. This has the same effect as physically shifting the pixels of one portion of the display, equivalent to mechanically shifting one of two separate displays.

Figure 8:
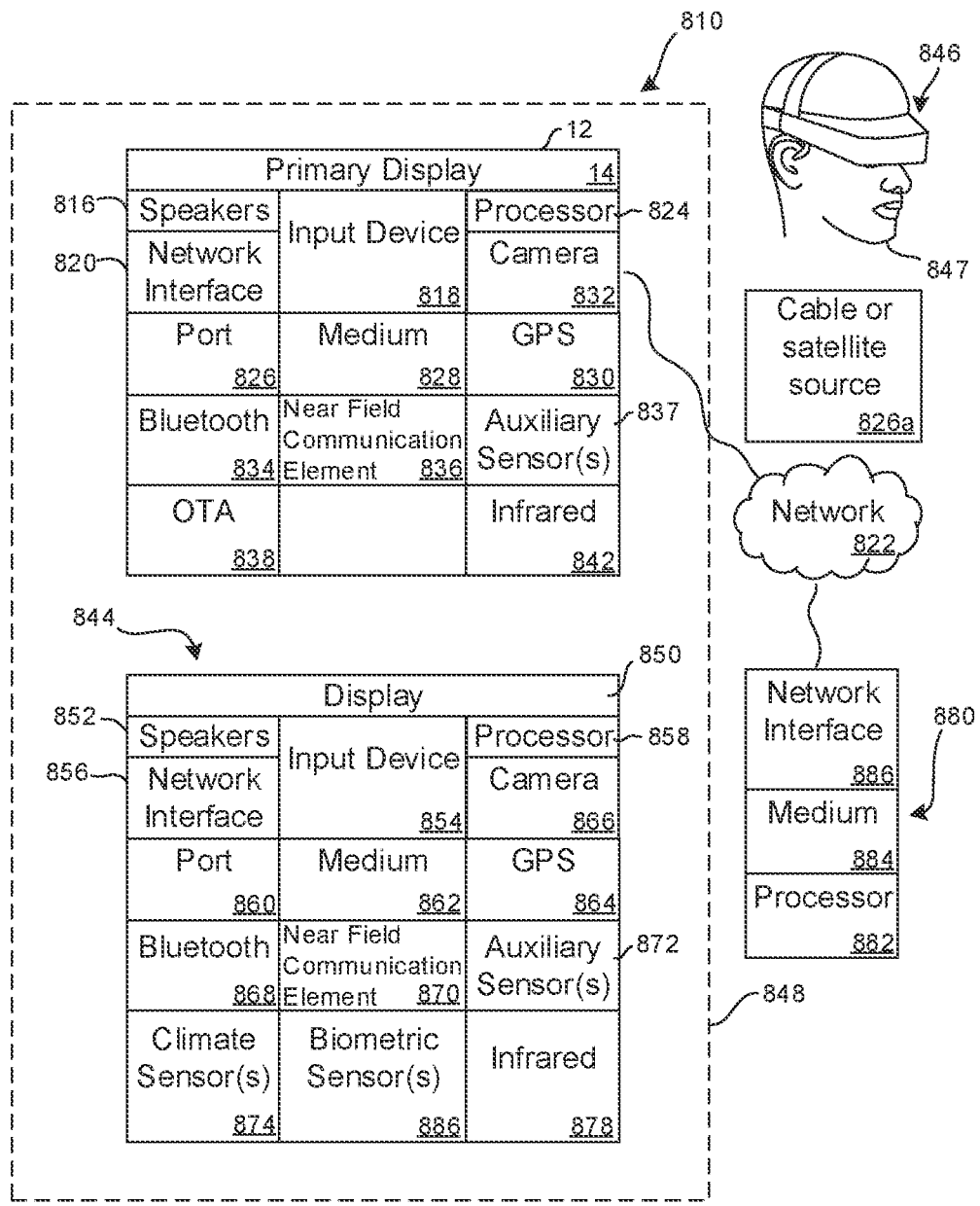
FIG. 8 is a block diagram of an example system in accordance with present principles.

Now referring to FIG. 8, servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc. Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

FIG. 8 illustrates an example system 800, which may include one or more of the example devices mentioned herein in accordance with present principles. The first of the example devices included in the system 800 is a consumer electronics (CE) device such as an audio video device (AVD) 812 such as but not limited to an Internet-enabled TV with a TV tuner (equivalently, set top box controlling a TV). However, the AVD 812 alternatively may be an appliance or household item, e.g., computerized Internet enabled refrigerator, washer, or dryer. The AVD 812 alternatively may also be a computerized Internet enabled ("smart") telephone, a tablet computer, a notebook computer, a wearable computerized device such as e.g., computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVD 812 is configured to undertake present principles (e.g., communicate with other CE devices to undertake present principles, execute the logic described herein, and perform any other functions and/or operations described herein).

Accordingly, to undertake such principles the AVD 812 can be established by some, or all of the components shown in FIG. 8. For example, the AVD 812 can include one or more displays 814 that may be implemented by a high definition or ultra-high definition "4K" or higher flat screen and that may be touch-enabled for receiving user input signals via touches on the display and that, like other displays herein, may employ present principles. The AVD 812 may include one or more speakers 816 for outputting audio in accordance with present principles, and at least one additional input device 818 such as e.g., an audio receiver/microphone for e.g., entering audible commands to the AVD 812 to control the AVD 812. The example AVD 812 may also include one or more network interfaces 820 for communication over at least one network 822 such as the Internet, an WAN, an LAN, etc. under control of one or more processors 824 including. A graphics processor 824A may also be included. Thus, the interface 820 may be, without limitation, a Wi-Fi transceiver, which is an example of a wireless computer network interface, such as but not limited to a mesh network transceiver. It is to be understood that the processor 824 controls the AVD 812 to undertake present principles, including the other elements of the AVD 812 described herein such as e.g., controlling the display 814 to present images thereon and receiving input therefrom. Furthermore, note the network interface 820 may be, e.g., a wired or wireless modem or router, or other appropriate interface such as, e.g., a wireless telephony transceiver, or Wi-Fi transceiver as mentioned above, etc.

In addition to the foregoing, the AVD 812 may also include one or more input ports 826 such as, e.g., a high-definition multimedia interface (HDMI) port or a USB port to physically connect (e.g., using a wired connection) to another CE device and/or a headphone port to connect headphones to the AVD 812 for presentation of audio from the AVD 812 to a user through the headphones. For example, the input port 826 may be connected via wire or wirelessly to a cable or satellite source 826a of audio video content. Thus, the source 826a may be, e.g., a separate or integrated set top box, or a satellite receiver. Or, the source 826a may be a game console or disk player containing content that might be regarded by a user as a favorite for channel assignment purposes described further below. The source 826a when implemented as a game console may include some or all of the components described below in relation to the CE device 844.

The AVD 812 may further include one or more computer memories 828 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 812 can include a position or location receiver such as but not limited to a cellphone receiver, GPS receiver and/or altimeter 830 that is configured to e.g., receive geographic position information from at least one satellite or cellphone tower and provide the information to the processor 824 and/or determine an altitude at which the AVD 812 is disposed in conjunction with the processor 824. However, it is to be understood that that another suitable position receiver other than a cellphone receiver, GPS receiver and/or altimeter may be used in accordance with present principles to e.g., determine the location of the AVD 812 in e.g., all three dimensions.

Continuing the description of the AVD 812, in some embodiments the AVD 812 may include one or more cameras 832 that may be, e.g., a thermal imaging camera, a digital camera such as a webcam, and/or a camera integrated into the AVD 812 and controllable by the processor 824 to gather pictures/images and/or video in accordance with present principles. Also included on the AVD 812 may be a Bluetooth transceiver 834 and other Near Field Communication (NFC) element 836 for communication with other devices using Bluetooth and/or NFC technology, respectively. An example NFC element can be a radio frequency identification (RFID) element.

Further still, the AVD 812 may include one or more auxiliary sensors 837 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 824. The AVD 812 may include an over-the-air TV broadcast port 838 for receiving OTA TV broadcasts providing input to the processor 824. In addition to the foregoing, it is noted that the AVD 812 may also include an infrared (IR) transmitter and/or IR receiver and/or IR transceiver 842 such as an IR data association (IRDA) device. A battery (not shown) may be provided for powering the AVD 812.

Still referring to FIG. 8, in addition to the AVD 812, the system 800 may include one or more other CE device types. In one example, a first CE device 844 may be used to send computer game audio and video to the AVD 812 via commands sent directly to the AVD 812 and/or through the below-described server while a second CE device 846 may include similar components as the first CE device 844. In the example shown, the second CE device 846 may be configured as a VR headset worn by a player 847 as shown. In the example shown, only two CE devices 844, 846 are shown, it being understood that fewer or greater devices may be used. For example, principles below discuss multiple players 847 with respective headsets communicating with each other during play of a computer game sourced by a game console to one or more AVD 812, as an example of a multiuser voice chat system.

In the example shown, to illustrate present principles all three devices 812, 844, 846 are assumed to be members of an entertainment network in, e.g., a home, or at least to be present in proximity to each other in a location such as a house. However, present principles are not limited to a particular location, illustrated by dashed lines 848, unless explicitly claimed otherwise. Any or all of the devices in FIG. 8 can implement any one or more of the lasers, etc. described previously.

The example non-limiting first CE device 844 may be established by any one of the above-mentioned devices, for example, a portable wireless laptop computer or notebook computer or game controller (also referred to as "console"), and accordingly may have one or more of the components described below. The first CE device 844 may be a remote control (RC) for, e.g., issuing AV play and pause commands to the AVD 812, or it may be a more sophisticated device such as a tablet computer, a game controller communicating via wired or wireless link with the AVD 812, a personal computer, a wireless telephone, etc.

Accordingly, the first CE device 844 may include one or more displays 850 that may be touch-enabled for receiving user input signals via touches on the display. The first CE device 844 may include one or more speakers 852 for outputting audio in accordance with present principles, and at least one additional input device 854 such as e.g., an audio receiver/microphone for e.g., entering audible commands to the first CE device 844 to control the device 844. The example first CE device 844 may also include one or more network interfaces 856 for communication over the network 822 under control of one or more CE device processors 858. A graphics processor 858A may also be included. Thus, the interface 856 may be, without limitation, a Wi-Fi transceiver, which is an example of a wireless computer network interface, including mesh network interfaces. It is to be understood that the processor 858 controls the first CE device 844 to undertake present principles, including the other elements of the first CE device 844 described herein such as e.g., controlling the display 850 to present images thereon and receiving input therefrom. Furthermore, note the network interface 856 may be, e.g., a wired or wireless modem or router, or other appropriate interface such as, e.g., a wireless telephony transceiver, or Wi-Fi transceiver as mentioned above, etc.

In addition to the foregoing, the first CE device 844 may also include one or more input ports 860 such as, e.g., a HDMI port or a USB port to physically connect (e.g., using a wired connection) to another CE device and/or a headphone port to connect headphones to the first CE device 844 for presentation of audio from the first CE device 844 to a user through the headphones. The first CE device 844 may further include one or more tangible computer readable storage medium 862 such as disk-based or solid-state storage. Also in some embodiments, the first CE device 844 can include a position or location receiver such as but not limited to a cellphone and/or GPS receiver and/or altimeter 864 that is configured to e.g. receive geographic position information from at least one satellite and/or cell tower, using triangulation, and provide the information to the CE device processor 858 and/or determine an altitude at which the first CE device 844 is disposed in conjunction with the CE device processor 858. However, it is to be understood that that another suitable position receiver other than a cellphone and/or GPS receiver and/or altimeter may be used in accordance with present principles to e.g., determine the location of the first CE device 844 in e.g., all three dimensions.

Continuing the description of the first CE device 844, in some embodiments the first CE device 844 may include one or more cameras 866 that may be, e.g., a thermal imaging camera, a digital camera such as a webcam, and/or a camera integrated into the first CE device 844 and controllable by the CE device processor 858 to gather pictures/images and/or video in accordance with present principles. Also included on the first CE device 844 may be a Bluetooth transceiver 868 and other Near Field Communication (NFC) element 870 for communication with other devices using Bluetooth and/or NFC technology, respectively. An example NFC element can be a radio frequency identification (RFID) element.

Further still, the first CE device 844 may include one or more auxiliary sensors 872 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 858. The first CE device 844 may include still other sensors such as e.g. one or more climate sensors 874 (e.g. barometers, humidity sensors, wind sensors, light sensors, temperature sensors, etc.) and/or one or more biometric sensors 876 providing input to the CE device processor In addition to the foregoing, it is noted that in some embodiments the first CE device 844 may also include an infrared (IR) transmitter and/or IR receiver and/or IR transceiver 878 such as an IR data association (IRDA) device. A battery (not shown) may be provided for powering the first CE device 844. The CE device 844 may communicate with the AVD 812 through any of the above-described communication modes and related components.

The second CE device 846 may include some or all of the components shown for the CE device 844. Either one or both CE devices may be powered by one or more batteries.

Now in reference to the afore-mentioned at least one server 880, it includes at least one server processor 882, at least one tangible computer readable storage medium 884 such as disk-based or solid state storage, and at least one network interface 886 that, under control of the server processor 882, allows for communication with the other devices of FIG. 8 over the network 822, and indeed may facilitate communication between servers and client devices in accordance with present principles. Note that the network interface 886 may be, e.g., a wired or wireless modem or router, Wi-Fi transceiver, or other appropriate interface such as, e.g., a wireless telephony transceiver.

Accordingly, in some embodiments the server 880 may be an Internet server or an entire server "farm" and may include and perform "cloud" functions such that the devices of the system 800 may access a "cloud" environment via the server 880 in example embodiments for, e.g., network gaming applications. Or, the server 880 may be implemented by one or more game consoles or other computers in the same room as the other devices shown in FIG. 8 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A head-mounted display (HMD), comprising:
    a left display portion;
    a right display portion;
    the display portions being configured for presenting identical images to produce a stereoscopic image in a binocular view of the display portions;
    "N" pixels in the left display portion being activatable to present "N" respective demanded image elements, each pixel in the left display portion being established by three subpixel elements;
    "N" pixels in the right display portion being activatable to present "N" respective demanded image elements, each pixel in the right display portion being established by three subpixel elements; wherein
    the "N" pixels in the right display portion are offset relative to the "N" pixels in the left display portion such that in the binocular view each pixel comprises four or more subpixel elements.

2. The HMD of claim 1, wherein the pixels in the right display portion are arranged in a layout in which a subset of subpixel elements are shared between pixels.

3. The HMD of claim 1, wherein the pixels in the right display portion are arranged in a layout in which a subset of subpixel elements are not shared between pixels.

4. The HMD of claim 1, wherein the "N" pixels in the right display portion are offset relative to the "N" pixels in the left display portion by a distance approximating a width of a subpixel element.

5. The HMD of claim 1, wherein the "N" pixels in the right display portion are offset relative to the "N" pixels in the left display portion in a horizontal dimension defined by the display portions.

6. The HMD of claim 1, wherein the "N" pixels in the right display portion are offset relative to the "N" pixels in the left display portion in a vertical dimension defined by the display portions.

7. The HMD of claim 1, wherein the "N" pixels in the right display portion are offset relative to the "N" pixels in the left display portion in a depth dimension defined by the display portions.

8. The HMD of claim 1, wherein the "N" pixels in the right display portion are offset relative to the "N" pixels in the left display portion in a rotational dimension defined by the display portions.

9. An apparatus comprising:
a left display portion;
a right display portion juxtaposed with the left display portion to generate, in concert with the left display portion, a stereoscopic image comprising a binocular overlap region in which objects at infinity focus in the stereoscopic image have higher resolutions than objects at infinity focus in portions of the stereoscopic image outside the binocular overlap region.

10. The apparatus of claim 9, wherein the display portions are supported on a head mounted display (HMD).

11. The apparatus of claim 9, wherein pixels in the right display portion are arranged in a layout in which subpixel elements are shared between pixels.

12. The apparatus of claim 9, wherein pixels in the right display portion are arranged in a layout in which subpixel elements are not shared between pixels.

* * * * *